(12) United States Patent
Sun et al.

(10) Patent No.: US 12,556,952 B2
(45) Date of Patent: Feb. 17, 2026

(54) CHANNEL STATE INFORMATION (CSI) ENHANCEMENT FOR SINGLE DOWNLINK CONTROL INFORMATION (DCI) MULTIPLE TRANSMISSION AND RECEPTION POINT (TRP) OPERATION

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Oghenekome Oteri, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 17/777,304

(22) PCT Filed: Aug. 6, 2021

(86) PCT No.: PCT/CN2021/111328
§ 371 (c)(1),
(2) Date: Feb. 9, 2023

(87) PCT Pub. No.: WO2023/010573
PCT Pub. Date: Feb. 9, 2023

(65) Prior Publication Data
US 2024/0172019 A1  May 23, 2024

(51) Int. Cl.
*H04W 24/10* (2009.01)
*H04L 5/00* (2006.01)

(52) U.S. Cl.
CPC ............ *H04W 24/10* (2013.01); *H04L 5/005* (2013.01)

(58) Field of Classification Search
None
See application file for complete search history.

(56) References Cited

U.S. PATENT DOCUMENTS

| | | | |
|---|---|---|---|
| 2019/0223161 A1* | 7/2019 | Muruganathan | ...... H04L 5/0035 |
| 2021/0250073 A1 | 8/2021 | Huang et al. | |

(Continued)

FOREIGN PATENT DOCUMENTS

| | | |
|---|---|---|
| CN | 112655239 A | 4/2021 |
| CN | 112822714 A | 5/2021 |

(Continued)

OTHER PUBLICATIONS

3rd Generation Partnership Project; Technical Specification Group Radio Access Network; NR; Multiplexing and channel coding (Release 16); 3GPP TS 38.212 V16.6.0 (Jun. 2021).

(Continued)

*Primary Examiner* — Xavier S Wong
(74) *Attorney, Agent, or Firm* — Eschweiler & Potashnik, LLC; Matthew Glause

(57) ABSTRACT

A user equipment (UE), baseband processor or other network device (e.g., base station, next generation NodeB, etc.) can operate to process or generate CSI reports based on a CSI report configuration for a single transmission and reception point (sTRP) operation and a multiple TRP (mTRP) operation. The CSI report can be configured based on a plurality of weighted CSI report priority variables, wherein the plurality of weighted CSI report priority variables comprises measurements associated the sTRP operation and measurements associated with the mTRP operation, and the measurements associated with the sTRP operation are configured with a different priority than the measurements associated with the mTRP operation.

19 Claims, 10 Drawing Sheets

(56) References Cited

U.S. PATENT DOCUMENTS

| | | | |
|---|---|---|---|
| 2023/0042048 A1* | 2/2023 | Kim | H04B 7/0695 |
| 2023/0073095 A1* | 3/2023 | Kim | H04W 72/1273 |
| 2023/0087003 A1* | 3/2023 | Hao | H04B 7/0632 |
| | | | 370/329 |
| 2023/0120578 A1* | 4/2023 | Khoshnevisan | H04L 1/0027 |
| | | | 370/329 |
| 2023/0387993 A1* | 11/2023 | Liu | H04B 7/0626 |
| 2023/0403591 A1* | 12/2023 | Hakola | H04W 24/08 |

FOREIGN PATENT DOCUMENTS

| | | | |
|---|---|---|---|
| WO | 2020056708 | A1 | 3/2020 |
| WO | 2021146992 | A1 | 7/2021 |

OTHER PUBLICATIONS

PCT Search Report and Written Opinion dated Mar. 8, 2022 in connection with PCT Application No. PCT/CN2021/111328.
ZTE CSI enhancements for Multi-TRP and FR1 FDD reciprocity; 3GPP TSG RAN WG1 #104b-e; R1-2102666 20; Apr. 20, 2021.
International Preliminary Report on Patentability dated Feb. 6, 2024 in connection with PCT Application No. PCT/CN2021/111328.
ZTE; "CSI enhancements for Multi-TRP and FR1 FDD reciprocity"; 3GPP TSG RAN WG1 #105-e R1-2104589; May 12, 2021.
Huawei HiSilicon; "Discussion on CSI Enhancements for Rel-17"; 3GPP TSG RAN WG1 #105-e R1-2104270; May 12, 2021.
Qualcomm Incorporated; "Intra-UE multiplexing and prioritization for IOT and URLLC"; 3GPP TSG RAN WG1 #105-e R1-2104666; May 12, 2021.
Nokia, Nokia Shanghai Bell; "Enhancement on CSI measurement and reporting"; 3GPP TSG RAN WG1 #105-e R1-2105277; May 12, 2021.
Qualcomm Incorporated; "Maintenance for CSI Measuremen"; 3GPP TSG RAN WG1 #92b R1-1805521; Apr. 18, 2018.
Apple Inc.; "Remaining Issues on Multi-beam operation"; 3GPP TSG RAN WG1 #99 R1-1912824; Nov. 9, 2019.
Japanese Office Action dated Dec. 9, 2024 in connection with Application No. 2024-507015.
European Extended Search Report dated Feb. 11, 2025 in Connection with Application No. 21952446.9.
VIVO: "Further discussion and evaluation on Multi-TRP CSI and partial reciprocity"; 3GPP TSG RAN WG1 #105-e R1-2104347; May 11, 2021.

* cited by examiner

CHANNEL STATE INFORMATION (CSI) ENHANCEMENT FOR SINGLE DOWNLINK CONTROL INFORMATION (DCI) MULTIPLE TRANSMISSION AND RECEPTION POINT (TRP) OPERATION

This application is a National Phase entry application of International Patent Application No. PCT/CN2021/111328 filed Aug. 6, 2021, entitled "CHANNEL STATE INFORMATION (CSI) ENHANCEMENT FOR SINGLE DOWNLINK CONTROL INFORMATION (DCI) MULTIPLE TRANSMISSION AND RECEPTION POINT (TRP) OPERATION", the contents of which are herein incorporated by reference in their entirety.

FIELD

The present disclosure relates to wireless technology including channel state information (CSI) enhancement for single downlink control information (DCI) multiple transmission and reception point (TRP) operation.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions. 5G wireless networks are expected to support massive connectivity, high capacity, ultra-reliability and low latency.

Such diverse use case scenarios require disrupting approaches for the realization of future 5G systems. It is envisioned that multiple transmission and reception points (multi-TRPs) will be vital in 5G in order to improve reliability, coverage, and capacity performance through flexible deployment scenarios. For example, to be able to support the exponential growth in mobile data traffic in 5G and to enhance the coverage, the wireless devices are expected to access networks composed of multi-TRPs (i.e., macro-cells, small cells, pico-cells, femto-cells, remote radio heads, relay nodes, etc.).

DETAILED DESCRIPTION

Figure 1:
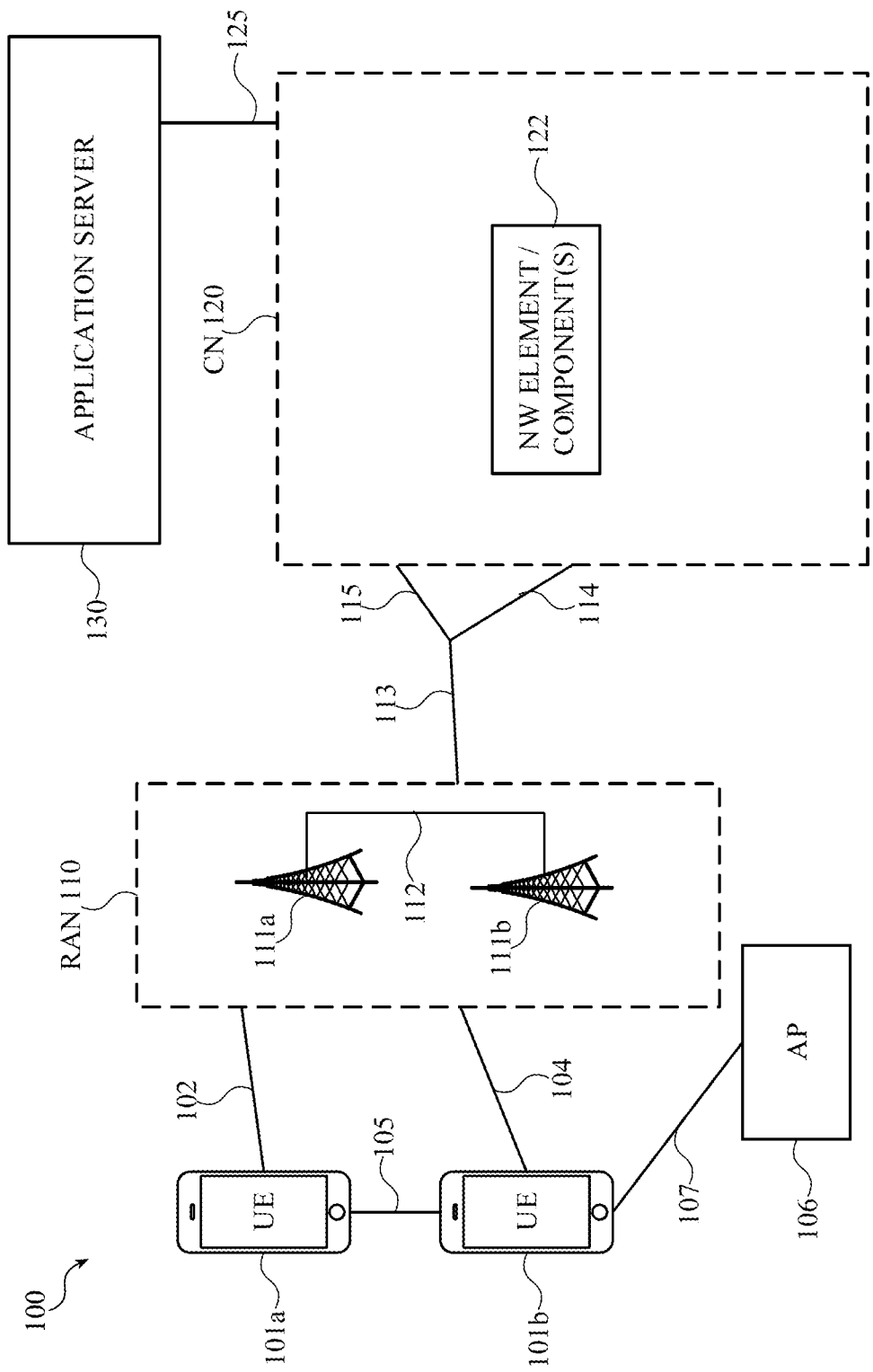
FIG. 1 illustrates an exemplary block diagram illustrating an example of user equipment(s) (UEs) communicatively coupled a network with network components as peer devices useable in connection with various embodiments (aspects) described herein.

In consideration of various concerns regarding multiple transmission and reception points (mTRPs) that are used in 5G in order to improve reliability, coverage, and capacity performance through flexible deployment scenarios, channel state information (CSI) report priority enhancement, dynamic channel measurement resource (CMR) resource configuration, and CSI compression can be configured according to aspects in this disclosure for supporting multiple TRP (mTRP) operation. In particular, CSI reporting can be configured for both mTRP and single TRP (sTRP). Users on a cell-edge can be served with a low quality-of-service (QoS) due to the comparatively long distance from the base station and unfavorable channel conditions (e.g., intercell interference (101) from neighboring base stations). Multiple TRP or mTRP operation can be one key to alleviate the ICI via dynamic coordination between the mTRPs, to provide joint scheduling and transmissions/receptions. In this way, a wireless device at the cell edge can be served by mTRP operation to improve its signal transmission/reception resulting in increased throughput.

Although some existing networks may support some mTRP schemes, the supported features may not accommodate newly identified deployment scenarios in 5G. For example, transmission of multiple control signals via mTRPs may be beneficial to improve reliability of the ultra-reliable low latency communication (uRLLC), vehicle-to-everything (V2X), and high-speed train use cases by providing link diversity gain, especially for the cell edge users. Moreover, high carrier frequencies (e.g., millimeter waves) in 5G facilitate deployment of a large number of antennas (e.g., so called massive-MIMO) at the base-station, which demands beam management procedures for mTRP technology.

In an aspect, a user equipment (UE) or other network component(s) can receive a downlink control information (DCI) or a radio resource control (RRC) message with a CSI resource configuration for generating a channel state information (CSI) report based on a sTRP operation and/or a mTRP operation. The CSI report can be generated based on the CSI report configuration and a plurality of CSI report priority variables that include measurements for sTRP operation and measurements for mTRP operation. In one example, the CSI report can be based on one or more CSI report priority variables associated with the measurements for the sTRP operation having a different priority (e.g., a higher priority or a lower priority) than for the measurements for the mTRP operation. The UE can compute priorities to be associated with these measurements as a function of the one or more of the CSI report priority variables and for generating the CSI report according to a UE capacity or payload for a single report, for example. Likewise, the base station or gNB can configure the DCI for both sTRP and mTRP in accord with these operations.

Currently, reference signal configuration or CMR resource configuration that is signaled by a RRC can be slow, in the order of 100s of milli-seconds (ms) to seconds compared to baseband signaling milliseconds or faster. However, a MAC CE can be signaled faster in the order of a few ms, 3-5 or to 10 ms. In an aspect, the UE or other network component can receive and process a media access control (MAC) control element (MAC-CE) configured by the base station or gNB that dynamically modifies/updates CMR resources of a CSI report configuration. The MAC-CE, for example, can include a CSI report configuration ID, a serving cell index and one or more selections of a number CMR resources for sTRP measurement and a number of pairs of CSI resources configured for mTRP measurement. Additionally, corresponding CSI interference measurement (CS-IM) resources can also be configured based on these MAC-CE modifications/updates. For example, CSI-IM resources, which include zero power interference measurement resources (IMR), can be activated or deactivated according to an updating of a number of CSI resources for sTRP and the number of pairs of CSI resources for mTRP measurement to dynamically update the CMR and IMR resources for a CSI report.

In another aspect, the CSI report can be generated based on a CSI compression so that one or more report quantities of the sTRP operation that are shared or in common with report quantities of the mTRP operation are reported once in the CSI report, rather than being repeated or overlapping one another. This implementation can save resources in terms of payload. The report quantities can include, for example, a CSI-RS resource indicator (CRI), a synchronization signal (SS)/physical broadcast resource block indicator (SSBRI), a rank indicator (RI), a precoding matrix indicator (PMI), or a layer indicator (LI), for example. Additionally, one or more indicators of CSI compression can be reported in the CSI report that corresponds to the one or more report quantities in the CSI report to show a report quantity value is being shared and reported only once. This can enable the gNB to not decode quantities unnecessarily, or, the UE to not report the quantities unnecessarily.

Additional aspects and details of the disclosure are further described below with reference to figures.

FIG. 1 illustrates example architecture of a system 100 of a network, in accordance with various embodiments (aspects). The following description is provided for an example system 100 that can be in conjunction with the LTE system standards and 5G or NR system standards as provided by 3GPP technical specifications. However, the example embodiments are not limited in this regard and the described embodiments can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111, 112, or other network nodes) that can be connected via non-ideal backhaul, one providing NR access and the other one providing either E-UTRA for LTE or NR access for 5G, for example. One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

In MR-DC, a group of serving cells associated with a master Node can be configured as a master cell group (MCG), comprising of a special cell (SpCell) as a primary cell (PCell) and optionally one or more secondary cells (SCells). An MCG can be the radio access node that provides the control plane connection to the core network (CN) 120; it may be a Master eNB (in EN-DC), a Master ng-eNB (in NGEN-DC) or a Master gNB (in NR-DC and NE-DC), for example. SpCell can either refer to the PCell of the MCG or the primary secondary cell (PSCell) of a second cell group (SCG) depending on if the MAC entity that is associated to the MCG or the SCG, respectively. An SpCell can refer to a PCell of MCG or an SCG. A SCG in MR-DC can be a group of serving cells associated with an SN, comprising of the SpCell as an PSCell and optionally one or more SCells.

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 3GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access AN nodes or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 5G system 100 (e.g., next generation NodeB (gNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or part of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications.

In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. In some instances, the gNB-DUs, gNB-CUs, or other functions of the RAN node 111 may be co-located while in other instances are not co-located and/or operated by different entities. Additionally, or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band").

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, 16).

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In aspects, the CN 120 can be a 5GC (referred to as "5GC 120" or the like), and the RAN 110 can be connected with the CN 120 via an NG interface 112. In embodiments, the NG interface 112 can be split into two parts, a Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs).

In aspects, where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Core NW elements/components 122 can include one or more of the following functions and network components: an Authentication Server Function (AUSF); an Access and Mobility Management Function (AMF); a Session Management Function (SMF); a Network Exposure Function (NEF); a Policy Control Function (PCF); a Network Repository Function (NRF); a Unified Data Management (UDM); an Application Function (AF); a User Plane (UP) Function (UPF); and a Network Slice Selection Function (NSSF).

The UPF, for example, can act as an anchor point for intra-RAT and inter-RAT mobility, an external Protocol Data Unit (PDU) session point of interconnect to Data Network (DN), and a branching point to support multi-homed PDU session. The UPF can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF can include an uplink classifier to support routing traffic flows to a data network. A DN can be various network operator services, Internet access, or third-party services, include, or be similar to, an application server. The UPF can interact with the SMF via an N4 reference point between the SMF and the UPF.

The AUSF, for example, can store data for authentication of UE 101 and handle authentication-related functionality. The AUSF can facilitate a common authentication framework for various access types. The AUSF can communicate with the AMF via an N12 reference point between the AMF and the AUSF; and can communicate with the UDM via an N13 reference point between the UDM and the AUSF. Additionally, the AUSF can exhibit an Nausf service-based interface.

The AMF, for example, can be responsible for registration management (e.g., for registering UE 101, etc.), connection management, reachability management, mobility management, and lawful interception of AMF-related events, and access authentication and authorization. The AMF can be a termination point for the N11 reference point between the AMF and the SMF. The AMF can provide transport for SM messages between the UE 101 and the SMF, and act as a transparent proxy for routing SM messages. AMF can also provide transport for SMS messages between UE 101 and a Short Message Service (SMS) Function (SMSF). AMF can act as Security Anchor Function (SEAF), which can include interaction with the AUSF and the UE 101 and/or receipt of an intermediate key that was established as a result of the UE 101 authentication process. Where Universal Subscriber Identity Module (USIM) based authentication is used, the AMF can retrieve the security material from the AUSF. AMF can also include a Single-Connection Mode (SCM) function, which receives a key from the SEA that it uses to derive access-network specific keys. Furthermore, AMF can be a termination point of a RAN Control Plane (CP) interface, which can include or be an N2 reference point between the (R) AN 110 and the AMF; and the AMF can be a termination point of Non Access Stratum (NAS) (N1) signaling, and perform NAS ciphering and integrity protection.

AMF can also support NAS signaling with a UE 101 over a non-3GPP (N3) Inter Working Function (IWF) interface. The N3IWF can be used to provide access to untrusted entities. N3IWF can be a termination point for the N2 interface between the (R) AN 110 and the AMF for the control plane, and can be a termination point for the N3 reference point between the (R) AN 110 and the UPF for the user plane. As such, the AMF can handle N2 signaling from the SMF and the AMF for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF via an N1 reference point between the UE 101 and the AMF, and relay uplink and downlink user-plane packets between the UE 101 and UPF. The N3IWF also provides mechanisms for IPsec tunnel establishment with the UE 101. The AMF can exhibit an Namf service-based interface, and can be a termination point for an N14 reference point between two AMFs and an N17 reference point between the AMF and a 5G Equipment Identity Register (5G-EIR) (not shown in FIG. 1).

The UE 101 can be registered with the AMF in order to receive network services. Registration Management (RM) is used to register or deregister the UE 101 with the network (e.g., AMF), and establish a UE context in the network (e.g., AMF). The UE 101 can operate in an RM-REGISTERED state or an RM-DEREGISTERED state. In the RM-DEREGISTERED state, the UE 101 is not registered with the network, and the UE context in AMF holds no valid location or routing information for the UE 101 so the UE 101 is not reachable by the AMF. In the RM-REGISTERED state, the UE 101 is registered with the network, and the UE context in AMF can hold a valid location or routing information for the UE 101 so the UE 101 is reachable by the AMF. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF can store one or more RM contexts for the UE 101, where each RM context is associated with a specific access to the network. The RM context can be a data structure, database object, etc. that indicates or stores, inter alia, a registration state per access type and the periodic update timer. The AMF can also store a 5GC Mobility Management (MM) context that can be the same or similar to an (Enhanced Packet System (EPS))MM ((E)MM) context. In various embodiments, the AMF can store a Coverage Enhancement (CE) mode B Restriction parameter of the UE 101 in an associated MM context or RM context. The AMF can also derive the value, when needed, from the UE's usage setting parameter already stored in the UE context (and/or MM/RM context).

Figure 2:
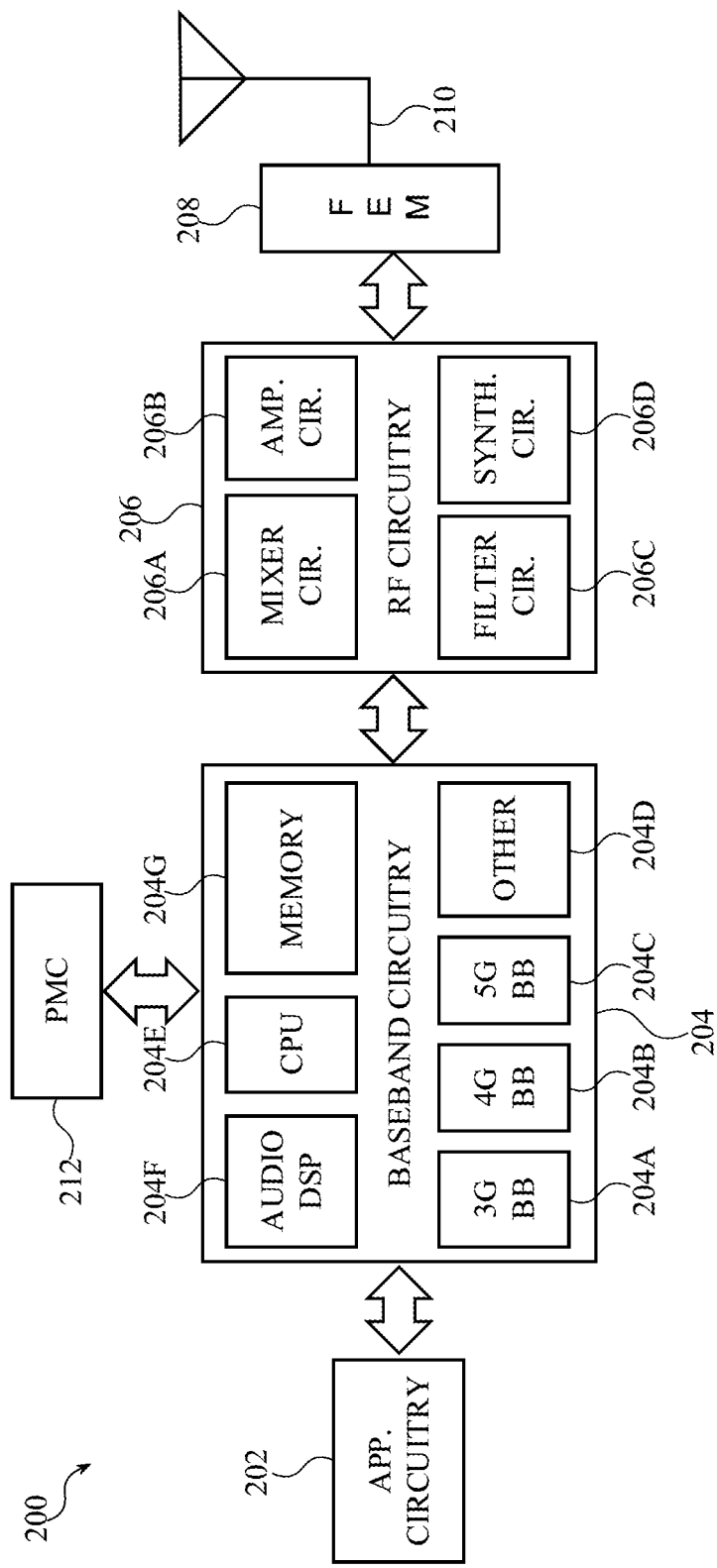
FIG. 2 illustrates a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node cannot utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit 204E. Memory 204G can include executable components or instructions to cause one or more processors (e.g., baseband circuitry 204) to perform aspects, processes or operations herein. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the application circuitry 202 depending on the desired output frequency. In some aspects, a divider control input (e.g., N) can be determined from a look-up table based on a channel indicated by the application circuitry 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM circuitry 208, or in both the RF circuitry 206 and the FEM circuitry 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM circuitry 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC Idle state, where it disconnects from the network and does not perform operations such as channel quality feedback, handover, etc. The device 200 goes into a very low power state and it performs paging where again it periodically wakes up to listen to the network and then powers down again. The device 200 cannot receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3 (L3), Layer 2 (L2), or Layer 1 (L1) functionality, while processors of the application circuitry 202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

Figure 3:
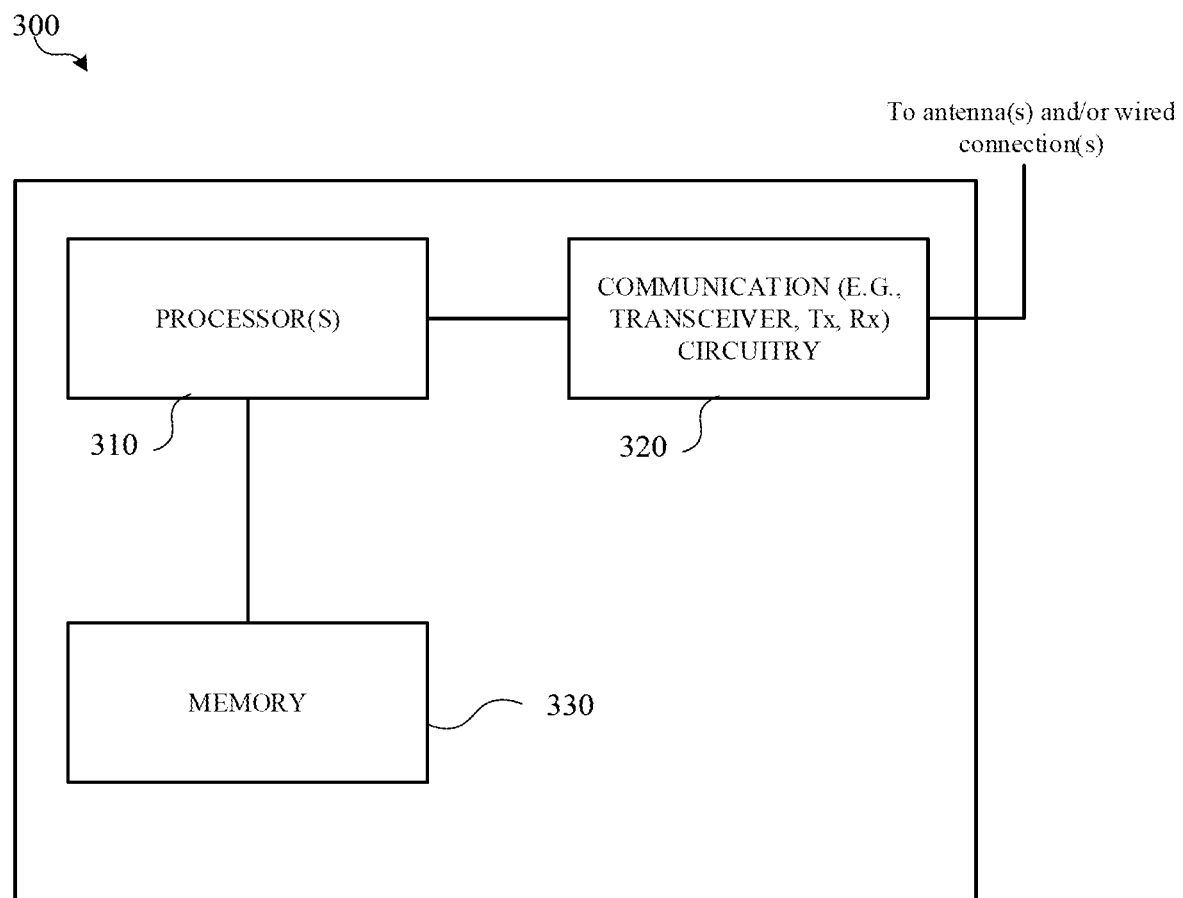
FIG. 3 illustrates an exemplary a simplified block diagram of a user equipment (UE) wireless communication device or other network device/component (e.g., eNB, gNB) in accordance with various aspects.

Referring to FIG. 3, illustrated is a block diagram of a user equipment (UE) device or another network device/component (e.g., gNB, eNB, or other participating network entity/component). The device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

Memory 330 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium.

In an aspect, the UE/gNB device 300 can operate to configure by processing/generating/encoding/decoding a physical layer transmission comprising multiple different transport blocks (TBs) based on an unequal protection between the different TBs in a physical layer encapsulation (e.g., EPC packets, a transmission opportunity, MOOT, a single transmission burst, a TTI or other encapsulation protocol or related encapsulation parameter(s) for the encapsulation of data from higher layers into frames for transmission over the air. The physical layer transmission can be received, transmitter, or provide(d) with communication/transmitter circuitry 320 to similarly process/generate the physical layer transmission with spatial layers via a physical channel in an NR network.

Processor(s) 310 can be components of application circuitry or processor(s) of the baseband circuitry that can be used to execute components or elements of one or more instances of a protocol stack. For example, processor(s) 310 of baseband circuitry, alone or in combination, can be configured to perform various aspects or embodiments for CSI enhancement for mTRP operation, such as single TRP (sTRP) and mTRP operation for CSI reporting. Different schemes can be configured for mTRP operation. This includes multi-DCI based multi-TRP operation, in which two different control information (e.g., different DCIs) schedule the transport blocks (TBs) for mTRP operation. Additionally, several schemes can be configured for single-DCI based Multi-TRP operation. For example, a spatial domain multiplexing (SDM) scheme can be used for a single TB, various frequency domain multiplexing (FDM) schemes (e.g., FDM Scheme A for a single TB and FDM Scheme B for dual TBs, as well as time domain multiplexing (TDM) schemes for intra-slot repetition. CSI reporting and CSI report generation via processor(s) 310 can be utilized to enable link adaptation for further CSI enhancement, as well as explicit interference hypothetical testing to optimize the precoder for each TRP and efficient switching between single TRP and multi TRP operation.

In an aspect, the processor(s) 310 can configure a set of CMR resources for a CSI report configuration, and differentiate which CMR resources are coming from which TRP. As such, the gNB 111 (e.g., as device 300) can inform the UE 101 (e.g., as device 300) of a total $K_s$ CSI resources, including a $K_1$ resource for a first TRP and $K_2$ resources for a second TRP, where $K_s=K_1+K_2$ includes the CMR resources configured for single-TRP measurement. The gNB 111 can also configure N pairs of the CMR resource pairs for mTRP measurement. Thus, two groups of the CMR resources for the sTRP measurement and a number N of CIS resource pairs can be utilized for the mTRP measurement by the CSI report configuration via a RRC message, for example.

For the CSI reporting or testing measurement configuration, the UE 101 can also report both sTRP (single TRP) resource(s) and mTRP resource(s) in one CSI report. For example, the UE 101 can inform the gNB 111 what is the preferred single TRP (e.g., either a first TRP or a second TRP), as well as which resource and transmission scheme details the UE 101 prefers (e.g., the CRI, PMI, the RI, CQI, or other quantity). The UE 101 can therefore report what is a preferred mTRP, including which resource the UE 101 prefers from a first TRP or which is preferred from a second TRP, for example.

Figure 4:
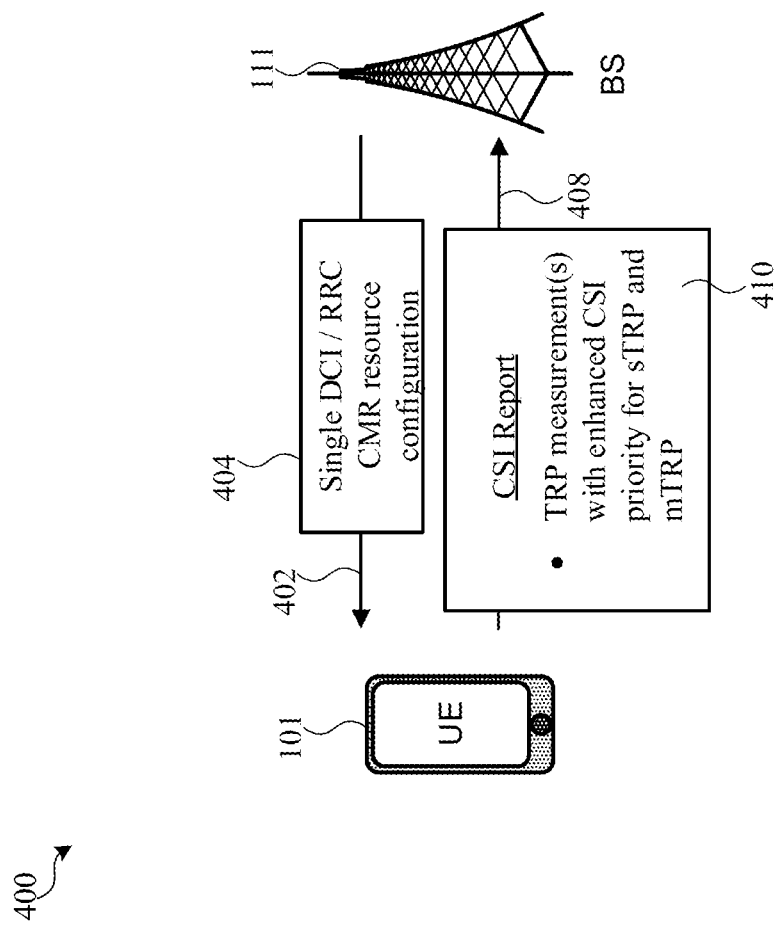
FIG. 4 illustrates example a channel state information CSI enhancement for single transmission and reception point (sTRP) and multiple TRP (mTRP) operation according to various aspects.

Referring to FIG. 4, illustrated is an example CSI enhancement for sTRP and mTRP operation according to various aspects herein. The UE 101 (e.g., as 300, or the like) can receive an RRC message or a DCI 404 in a physical channel 402 with a CSI report configuration provided by the gNB 111 to enable/trigger a report of both sTRP measurements and mTRP measurements. The UE 101 can then measure both sTRP measurements and mTRP measurements in sTRP operations and mTRP operations (or testing operations via hypothesis testing) and generate a CSI report 410 in an uplink physical channel 408.

In various aspects, a CSI report priority can be computed based on CSI report priority variables that can include a report type, report quantity, serving cell index, report configuration ID, and sTRP/mTRP operation. Each of these variables can be weighted in priority, and if a priority weighting/ordering for one variable is the same or similar to the weighting of another, then a next variable can be configured as more significant than another less weighted variable. For example, a report type can carry a greater weighting than a report quantity, which can have a greater weighting than a serving cell index or a report configuration ID. In an aspect, the sTRP/mTRP operation measurements can be given a highest priority weighting/ranking among the priority variables or a lowest priority weighting/ranking from among the measurements.

Additionally, within each priority variable, factors/parameters associated with each priority variable can also be given a different priority/ranking/ordering. For example, a report type can include, for example, an aperiodic CSI (AP-CSI) on a PUSCH, a semi-persistent CSI (SP-CSI) on PUSCH, an SP-CSI on PUCCH, and a persistent CSI (P-CSI) on PUCCH; where each can be with a ranking/priority order from highest to lowest with the report type. The report quantity can include a link adaptation measure for beam management such a beam quality (e.g., layer 1 (L1)-reference signal received power (RSRP) or L1-signal to interference plus noise ratio (SINR), or others (e.g., a precoder matrix indicator (PMI), a channel quality indicator (Cal), a Rank Indicator (RI), or the like). Likewise, each of these can also be given a particular priority as a sub-priority or ranking with a report quantity having its own priority among the CSI report priority variables.

In an aspect, CSI enhancement in a single-DCI for Multi-TRP, in a single CSI report is configured when the gNB 111 configures the UE 101 to report both the single-TRP (sTRP) measurement and multi-TRP measurement (mTRP). The corresponding CSI can be split/divided into two or more parts, with each part having a different priority. The CSI report can have measurements corresponding to different parts of one or more CSI, each with different priority. Alternatively, or additionally, the CSI priority variables in CSI reporting can be weighted or assigned a priority such that an mTRP measurement has a higher priority compared to an sTRP measurement. Alternatively, or additionally, an sTRP measurement can have a higher priority compared to an mTRP measurement.

The UE 101 can be configured to process multiple CSIs, especially when mTRP is configured for multiple reports being reported in a single CSI report based on a received CSI report configuration. These CSIs can have different properties with different time domain priorities, as discussed above with respect to the different priority variables by report type, report quantity, serving cell and configuration ID as well as sTRP/mTRP, which can be measured, tested and defined for the CSI report.

The UE 101 can uniquely compute a CSI, and uniquely compute a CSI priority, for example. This CSI priority can be configured for at least two purposes: to configure uplink control information (UCI) multiplexing omission as UCI omission, and perform multiplexing of the CSI, so that the CSI can be carried in a same PUCCH or in a same PUSCH payload. If the total CSI size is larger than what the payload can carry, or the corresponding PUCCH/PUSCH can carry, then CSI skipping or UCI omission can be performed where some of the CSI report may be ignored or not reported based on the CSI report priority. Hence, the lower priority CSI could be multiplexed in a later part of the payload, and if the size of the payload is not large enough those CSI or partitioned parts can be skipped or omitted.

The CSI priority can relate to processing complexity in a CSI processing unit (CPU). The UE 101 can report a number of CPUs that the UE 101 can process per slot by informing the gNB 111 how many CSI process units (or CPUs) in each slot that the UE can process based on a UE capability. If the gNB 111 configures the CSI report such that more CPUs are to be utilized than the UE 101 can process, or more than the UE capability, then the UE 101 may not be required to update the CSI reports that exceed the UE reported capability.

The UE behavior when the CSI report configuration requires more CPU than the UE capability can be referred to herein as CPU overbooking handling. As a result of CPU overbooking handling, the UE 101 could be forced to alter a CSI processing order, for example. In one aspect, the UE 101 can report the old/current measurements for the CSI report, despite an updated CSI report configuration when CPU overbooking handling occurs.

In a single CSI report configuration with sTRP and mTRP measurements being reported, the UE 101 can configure the priority according to different variables, including whether the measurement is for sTRP operation, mTRP operation, or both when utilizing CSI priority to reduce the impact on CSI multiplexing and UCI omission operations, or CPU overbooking handling, for example. CSI multiplexing includes combining the different CSI measurements for a CSI report, while UCI omission can refer to omitting CSI parts of the report according to a priority in an uplink transmission.

In an aspect, a corresponding CSI can be split into two or more parts, while each part can be associated with a different priority. For example, a multi-TRP measurement can have a higher priority compared to a single-TRP measurement. Alternatively, or additionally, a single-TRP measurement can have a higher priority compared to multi-TRP measurement.

Figure 5:
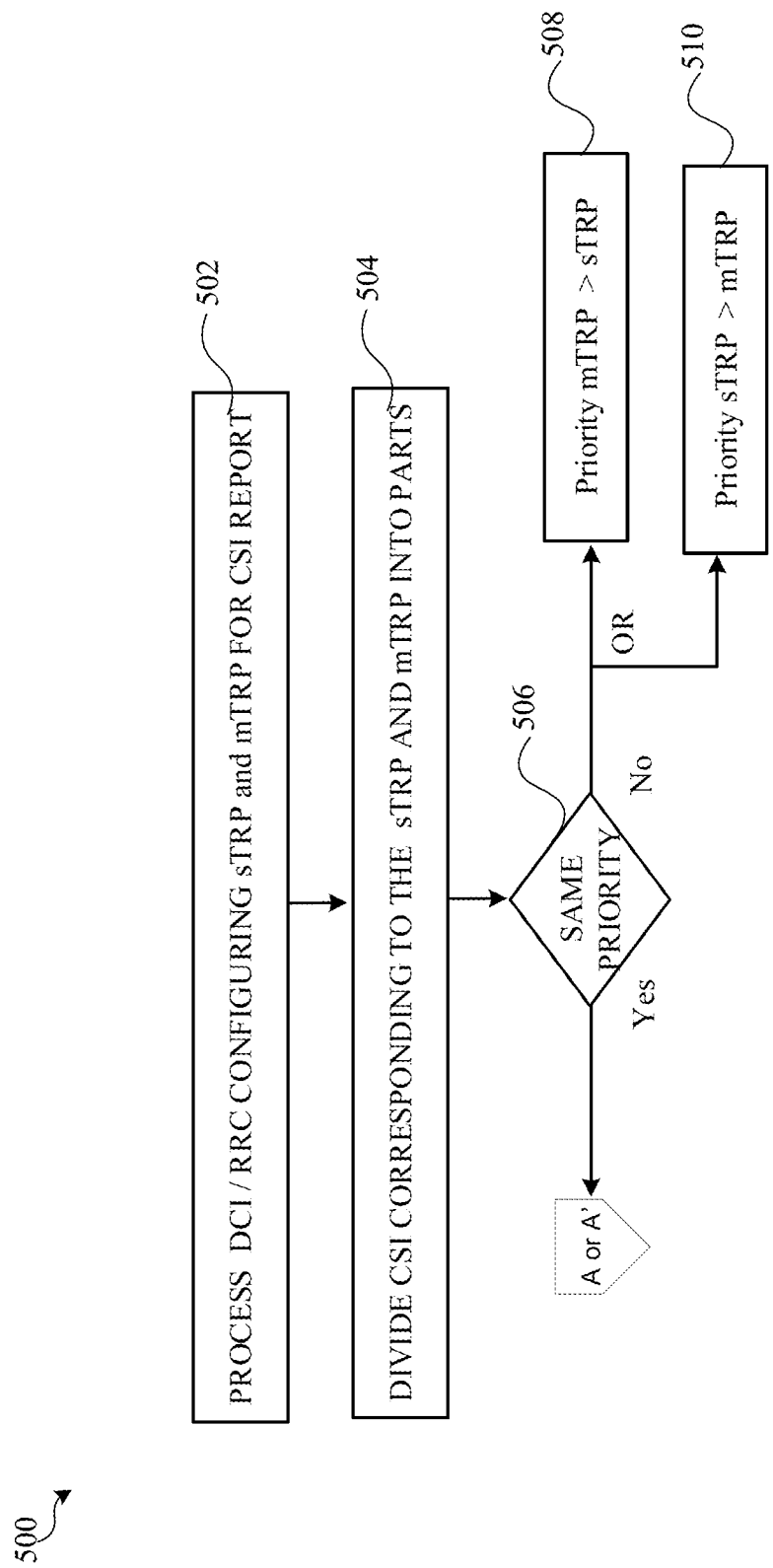
FIG. 5 illustrates an example process flow for CSI enhancement for sTRP and mTRP operation according to various aspects.

Referring to FIG. 5, illustrated is an example process flow 500 for a CSI report priority enhancement for sTRP and mTRP operations according to aspects herein. The process flow can initiate at 502 with processing an RRC or DCI for configuring sTRP and mTRP for measurement and generating the CSI report. At 504, the CSI can be divided into two or more CSI parts. A determination 506 can be made whether the parts (e.g., sTRP measurements, mTRP measurements, different CSI, etc.) have a same priority. If the parts are configured with a same priority, then the process can flow to reference "A or A'" at FIG. 8 or 9, respectively. If the CSI parts have a different priority, then the process flows to either 508 where mTRP measurements are given a higher priority for the CSI report than sTRP, or at 510 where sTRP measurements have a higher priority than mTRP.

Figure 6:
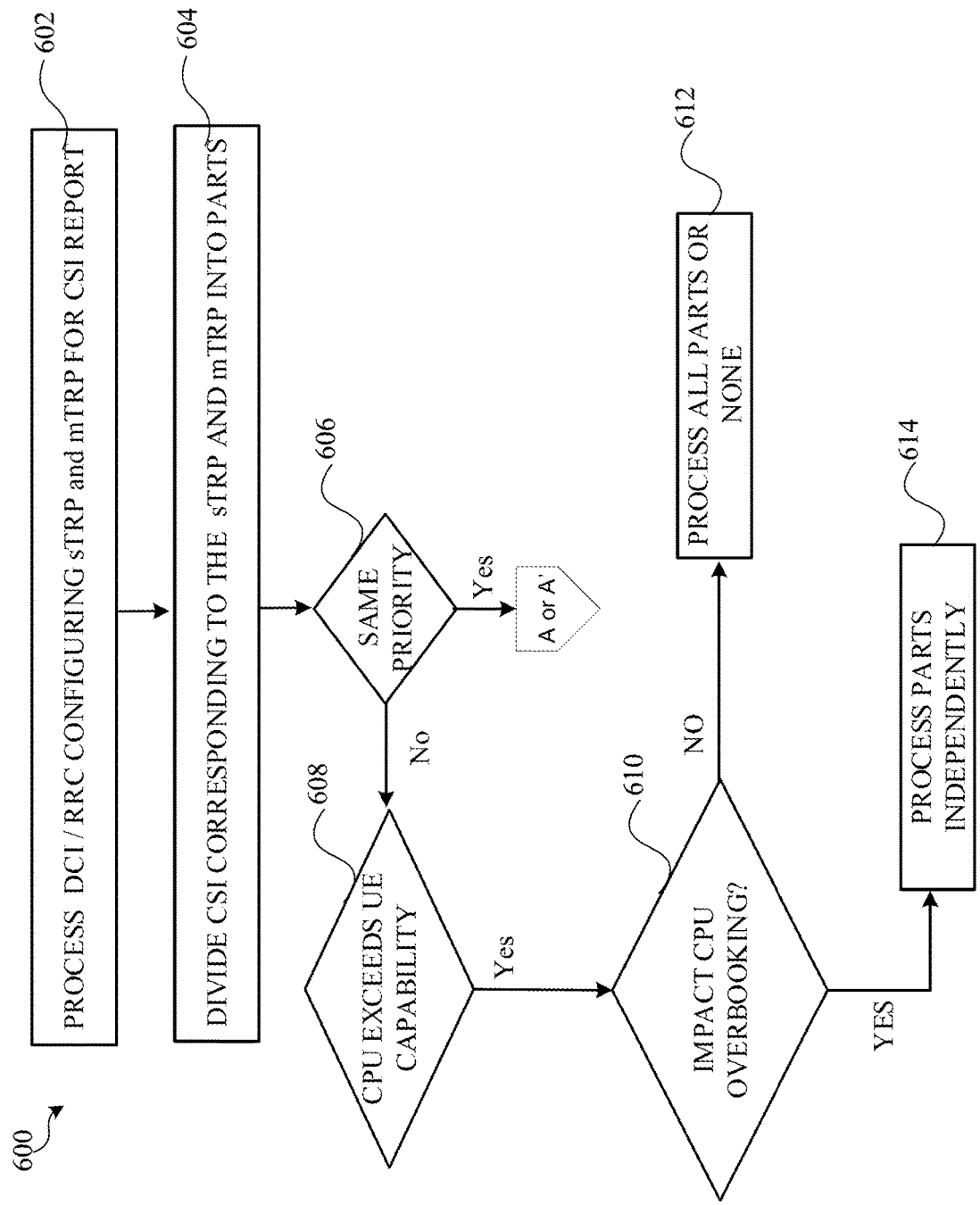
FIG. 6 illustrates another example process flow for CSI enhancement for sTRP and mTRP operation according to various aspects.

Referring to FIG. 6, illustrated is another example process flow 600 for a CSI report priority enhancement for sTRP and mTRP according to aspects herein. Process flow acts 602 and 604 can be similar to acts 502 and 504 of FIG. 5, for example. At 602, the UE 101 can process a single RRC or single DCI that configures the UE to report both sTRP and mTRP. The corresponding CSI can be split into two or more CSI parts. Then each CSI part can be assigned a same or a different priority such that each CSI part is associated with a sub-CSI-report priority. The CSI report can be configured differently depending on an impact to CPU overbooking (e.g., CPUs exceeding a payload) based on the sub-CSI-report priorities.

If a determination 606 is made that the CSI parts do not have a same priority at 606, a determination 608 can determine whether more CPUs are configured via a CSI report configuration (e.g., CSI-reportConfig, or the like) for the CSI report than a UE capability. If the CPUs exceed the UE capability at 608, a determination can be made at 610 as to whether one or more sub-CSI-report priorities impacts CPU overbooking or processing capacity of the CSI report for sTRP and mTRP. Alternatively, if the CSI parts are determined to be assigned a same priority the process flow 600 can flow to reference "A or A'" at FIGS. 8 and 9, respectively.

After dividing/partitioning the CSI into a plurality of CSI parts associated with priorities for the CSI report (as sub-CSI-report priorities), in response to the one or more of the CSI parts with sub-CSI-report priorities not impacting a CPU overbooking handling and a total CSI exceeding a payload amount for a physical channel transmission of the CSI report, the UE 101 can configure all of the plurality of CSI parts, or none of the plurality of CSI parts for the CSI report.

In one aspect, if a sub-CSI-report priority of a CSI part is determined to not impact the CPU overbook handling at determination 610, such that the gNB 111 configures more CPUs than the UE capability for the CSI report, the UE 101 at 610 can determine to process all the parts of the CSI report for reporting measurements at 612. Alternatively, or additionally, at 612 the UE 101 can omit updating all of the CSI parts in the CSI report.

If the sub-CSI-report priority is determined to impact the CPU overbook handling at determination 610, and more CPUs are configured for CSI reporting than the UE capability, the UE 101 can determine to omit updating the CSI measurements for each individual part of the CSI report independently, depending on the sub-CSI-report priorities of the CSI parts.

In an aspect, if the gNB 111, for example, or RRC configures more CSI processing units than the UE 101 can process in a single CSI report, then the UE 101 can be configured with a flexibility to select whether to process all of the CSI parts in the CSI report, process a part of the CSI parts in the CSI report, or process none of the CSI parts in the CSI report.

For example, if the UE 101 can only process one CPU and one CSI report has both single TRP and multi TRP that utilize one CPU each, then the UE 101 can process a higher priority CSI measurement and be enabled to skip the low priority CSI measurement. As such, the CSI processing order could be determined by the CSI report priority within a single CSI report configuration.

Figure 7:
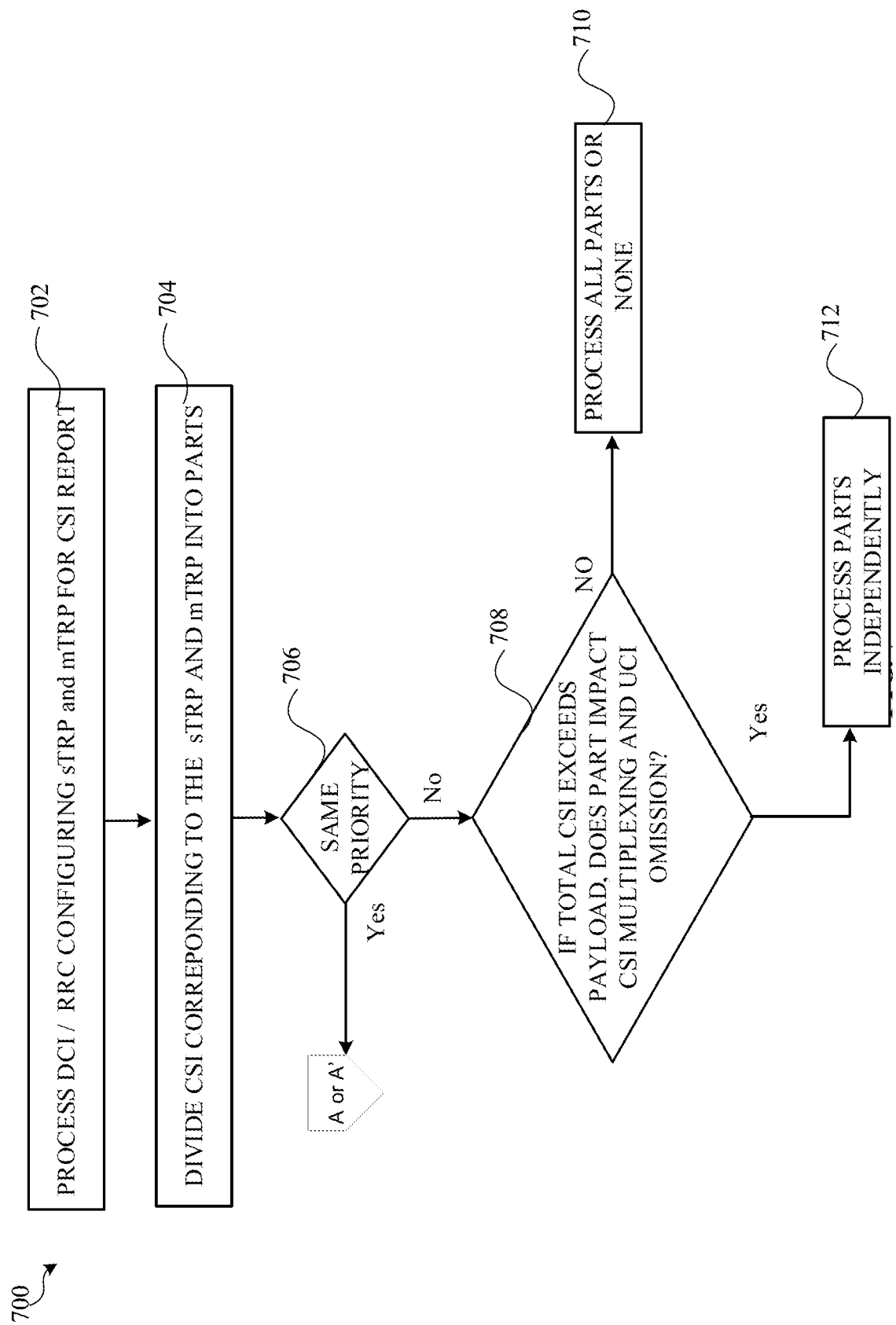
FIG. 7 illustrates another example process flow for CSI enhancement for sTRP and mTRP operation according to various aspects.

Referring to FIG. 7, illustrated is another example process flow 600 for a CSI report priority enhancement for sTRP and mTRP according to aspects herein. Process flow acts 702 and 704 can be similar to acts 502 and 504 of FIG. 5 as well as acts 602 and 604 of FIG. 6, for example. At 702, the UE 101 can process a single RRC or single DCI that configures the UE to report both sTRP and mTRP. The corresponding CSI can be split into two or more CSI parts at 704. Then each CSI part can be assigned a same or a different priority such that each CSI part is associated with a sub-CSI-report priority. The CSI report can be configured differently depending on an impact to CSI multiplexing and UCI omission based on the sub-CSI-report priorities. For example, an impact can be observed when CSI measurements of CSI parts with a lower priority (e.g., based on report priority variables) could be multiplexed at a lower end of a CSI transmission and omitted in UCI, which is further described infra at FIG. 8.

At 706, a determination is made whether sub-CSI-report priorities are the same or different from one another. If not the same, then the process flows to determination 708. If the same, the process flows to reference "A or A'" at FIGS. 8 and 9, respectively.

At 708, if a total CSI to be reported in the CSI report exceeds a single payload of a PUCCH/PUCCH, a determination can be made whether a sub-CSI-report priority associated with a CSI part impacts a CSI multiplexing operation and UCI omission. If the determination is no, then the UE 101 can select to provide all of the CSI parts of the CSI report or omit all of the parts of the CSI report. However, if an impact is determined to be made to the CSI multiplexing operation and UCI omission, then the UE 101 can omit the CSI content for each individual CSI part of the CSI report independently based on the priority.

Figure 8:
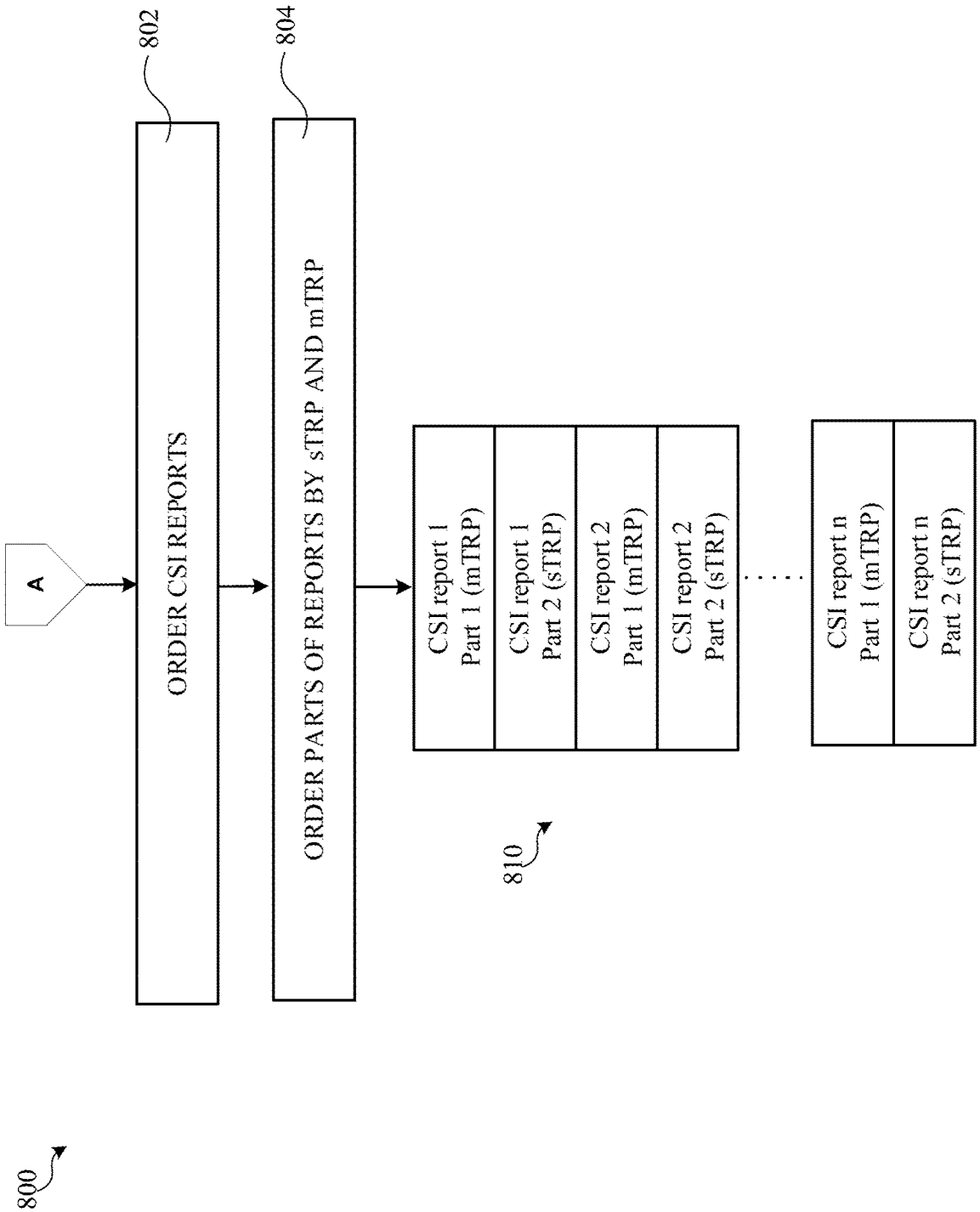
FIG. 8 illustrates another example process flow and CSI report configuration for CSI enhancement for sTRP and mTRP operation according to various aspects.

Referring to FIG. 8, illustrated is an example process flow 800 with resulting CSI report for sTRP and mTRP according to aspects herein. The process flow 800 begins with reference A of FIGS. 5 thru 7.

In response to receiving a CSI report configuration, the UE 101 generates multiple CSI reports for sTRP and mTRP measurements and multiplexes them into a same payload. Here, the UE 101 can be configured to multiplex both sTRP measurements and mTRP measurements as a mixture into one CSI report for a single transmission.

At 802, the UE 101 can generate the CSI report by ordering different CSI parts within each CSI sub-report. At 804, the parts are ordered within each CSI sub-report by mTRP and sTRP measurements and the CSI sub-CSI reports are concatenated to create a single CSI report 810. As such, different measurement reports as CSI-sub-reports are divided for corresponding CSI in a plurality of parts with a same priority. The different measurements reports can be multiplexed according to mTRP measurements and sTRP measurements and then the different CSI measurement reports as CSI-sub-reports can be concatenated together into one CSI report.

FIG. 8 can also imply a priority when the UE 101 is performing UCI omission such that a lower part or lower indexed report/part could be omitted first. This implies that when UCI omission is performed the UE 101 would first omit per report, and then first try to omit from a particular CSI report either part sTRP or mTRP, depending on the priority associated with sTRP or mTRP, for example. Then the UE 101 could report everything from the other CSI report part, resulting in a certain priority implementation.

Figure 9:
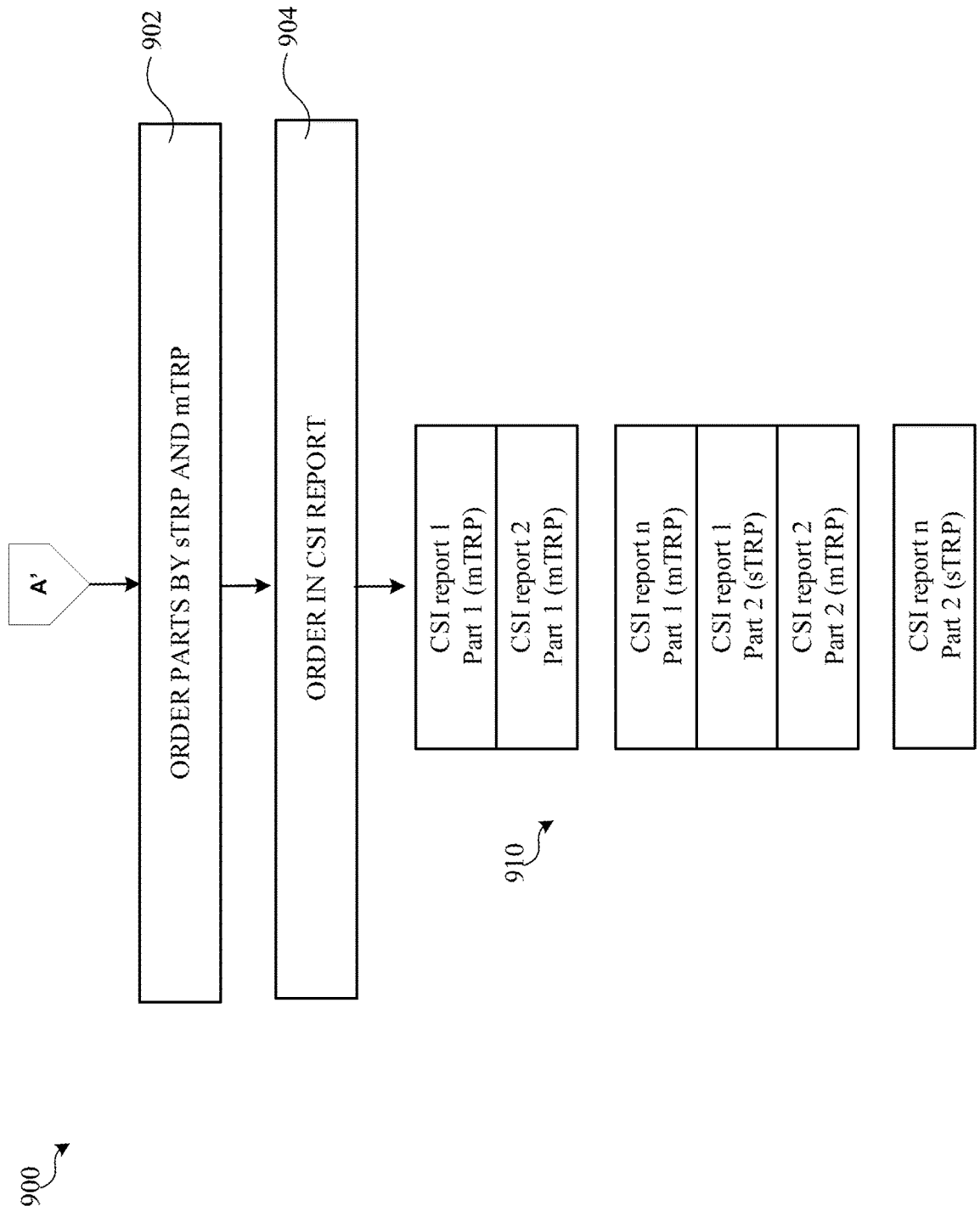
FIG. 9 illustrates another example process flow and CSI report configuration for CSI enhancement for sTRP and mTRP operation according to various aspects.

Referring to FIG. 9, illustrated is another example process flow 900 with resulting CSI report for sTRP and mTRP according to aspects herein. The process flow 900 begins with reference A' of FIGS. 5 thru 7.

At 902, the UE 101 concatenates all the sTRP parts together and all the mTRP together separately. At 904, each of these concatenated parts are further concatenated together by order in CSI report. In other words, the UE 101 may first order the parts in terms of sTRP or mTRP, and then we order within the CSI report in order of different measurement reports as CSI-sub-reports.

In this case, the mTRP is implied to have priority over sTRP concatenated parts with respect to CSI multiplexing and UCI omission. This is an example of treating sTRP as a lower priority. Alternatively, or additionally, sTRP could have a higher ordering or implicit priority in the CSI report than the mTRP by means of a different indexing order, for example. Thus, even though a priority associated to each report part or sub-report may not differ, the ordering can still imply a priority with respect to CSI multiplexing and UCI omission.

Figure 10:
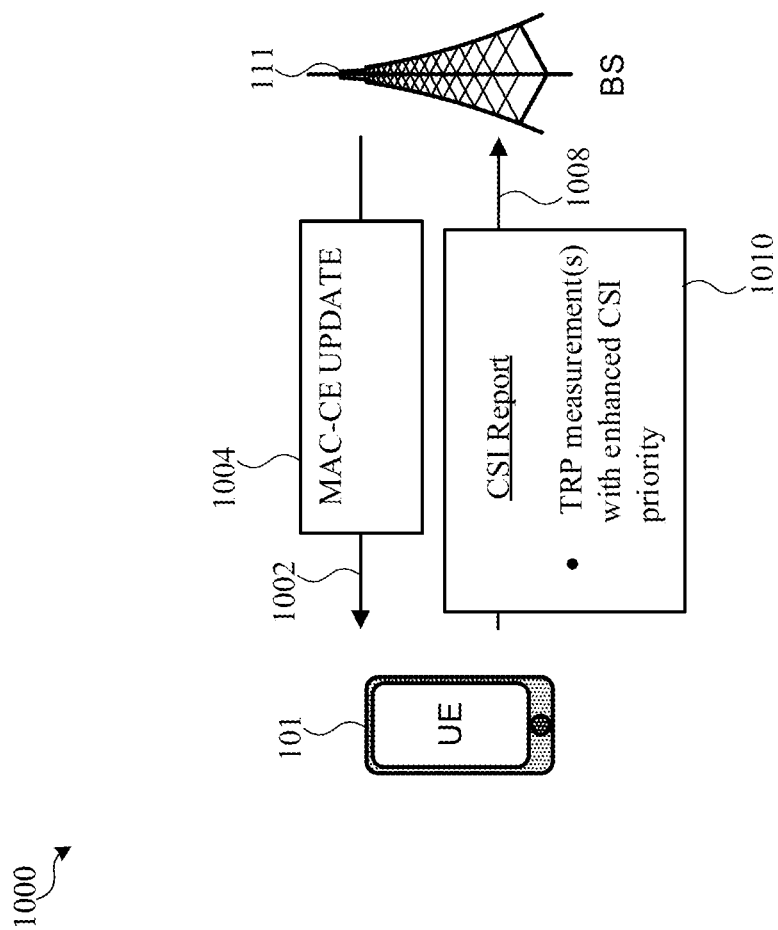
FIG. 10 illustrates another example CSI enhancement for sTRP and mTRP operation according to various aspects.

Referring to FIG. 10, illustrated is another example of another CSI enhancement for mTRP operation according to various aspects herein. The UE 101 can further receive an updated configuration 1004 in a downlink physical channel 1002 from the gNB 111 to dynamically update CMR resources in a CSI report configuration for a single CSI report 1010 transmission in an uplink physical channel (e.g., PUCCH or PUSCH).

The MAC-CE can include a CSI report configuration ID, a serving cell index and one or more selections for CSI resources. The selections can include a number CSI resources for sTRP measurement (e.g., $K_1$' resources for a first TRP and $K_2$' resources for a second TRP) and a number of N' pairs of CSI resources configured for mTRP measurement. RRC signaling can operate to configure a superset of resources such as for $K_1$ and $K_2$ resources for sTRP, and N pairs for mTRP. The gNB 111 can be configured to modify or update these resources dynamically, for example, by using a MAC-CE, instead of using RRC to reconfigure them.

The CSI report configuration update can be identified by the UE 101 with at least two report variables: the serving cell index, which indicates a serving cell, and a report configuration ID (e.g., CSI-reportConfigId). While the RRC can configure a super-set, or a large set of the Ks (K1 plus K2) resources for sTRP and a large set of N pairs for mTRP, the gNB 111 can modify CMR resource selection via the MAC-CE within this super-set. For example, the MAC CE can be used to select a subset of this larger superset of CMR resources in various aspects or manners.

In one example, the gNB 111 can provide a bitmap with the MAC-CE that indicates CMR resources to be activated or deactivated. The CMR resources (as CSI resources for CSI measurement) in the bitmap can include a maximum number of resources being configured ($K_{max}$), which can be maximum of resources configured, and an $N_{max}$, which can be maximum number of pairs of resources for mTRP. A bit corresponding to a bitmap location in the bitmap can indicate that corresponding CMR resources or reference signals are activated for measuring or deactivated for measuring to generate the CSI report for both sTRP and mTRP.

In another example, rather than utilizing a bitmap, the MAC-CE can reduce overhead by indicating how many first resources in order of the superset to select from. For example, the network or gNB 111 can indicate $K_1$', $K_2$', N', where $K_1$' indicates a selection of first CMR resources for a first TRP, $K_2$' indicates second CMR resources for a second TRP, and N' indicates a number of first pairs of resources for mTRP measurements. For example, if the gNB 111 configures 16 $K_1$, 16 $K_2$ and 16 N, but subsequently the gNB 111 can indicate to the UE 101 that $K_1$' equals to 2, $K_2$' equals to 2, and N' equals to 1. In response, the UE 101 measures the first two CMR resources within a first set of the super-set for the first TRP as a sTRP operation, the first two CSI resources within a second set of the super-set for a second TRP as a sTRP operation, and then for the mTRP operation only measure the first pair of the resources. Each of $K_1$', $K_2$', N' can be different resources in order of priority of the superset, for example. The UE 101 then generate the CSI report according to the updated CSI report configuration based on the MAC-CE CMR resource selection using the $K_1$', $K_2$', N' in an order of priority or indices within the super-set, for example.

In other aspects, corresponding CSI interference measurement (CS-IM) resources can also be configured based on the MAC-CE modifications/updates to enable a dynamic CMR resource selection as well as CSI-IM configuration. For example, CSI-IM resources (including zero power interference measurement resources (IMR)) can be activated or deactivated according to an updating of a number of CSI resources for sTRP and the number of pairs for mTRP measurement for dynamically updating the CMR resources for a CSI report.

For every CMR including a single CMR resource for sTRP measurement or a pair of CSI resources for the mTRP measurement, the gNB 111 can configure a corresponding CSI-IM resources. This can be preconfigured or predetermined as a one to one mapping of CMR resources to CSI-IM resources, for example. If the gNB 111 configures eight CMR resources for a first TRP, eight CMR resources for a second TRP and eight pairs of CMR resources for the mTRP, for example, then the gNB 111 configures a total of twenty-four zero power IMR or CSI-IM resources in one-to-one correspond to the total CMR resources. In a further example, if the MAC-CE selects a particular CMR, then the corresponding IMR or CSI-IM can also be activated. Likewise, if the network deactivates a CMR it would also deactivate the corresponding IMR or CSI-IM.

In other aspects, the gNB 111 can provide an indication to the UE 101 to only report sTRP testing, mTRP testing or both in a dynamic updating via the MAC-CE. By way of the CSI report configuration, the UE 101 can be configured to enable reporting of both sTRP testing and mTRP testing according to measurement hypothesis. However, the gNB 111 can dynamically change the CSI reporting via the MAC-CE to configure only sTRP measurements, only mTRP measurements, or both sTRP and mTRP by way of testing measurements for the CSI report (in a single transmission or single CSI report). In particular, a single DCI/RRC message can enable mTRP measurements with sTRP measurements in a single CSI report by means of a single TRP hypothesis, multiple TRP hypothesis (as a testing technique or methodology), while a MAC-CE can be used to update the measurement hypothesis dynamically with the values of a CSI-ReportConfigId: CSI Report Configuration ID; a ServCellIndex: Serving cell index, and a report hypothesis selection for sTRP, mTRP or both. This can be communicated in the MAC-CE with a bitmap, for example. The bitmap can indicate whether the corresponding measurement hypothesis is activated or deactivated. For example, if only sTRP is indicated to be reported by the UE 101, then the UE 101 can configure measurement testing for sTRP alone for the next CSI report.

Additionally, or alternatively, the UE 101 can configure the CSI report by performing a CSI compression operation to reduce the payload of the CSI report transmission. The CSI report can comprise various report quantities that could be shared or in common between the sTRP report part and the mTRP report part of the CSI report. These report quantities can include, for example, a CSI-RS resource indicator (CRI), a synchronization signal (SS)/physical broadcast resource block indicator (SSBRI), a rank indicator (RI), a precoding matrix indicator (PMI) and a layer indicator (L1). The CRI indicates the gNB 111 which CSI-RS is preferred for transmission. SSBRI indicates the synchronization signal block (SSB) that is preferred for CMR resource selection. Then once the CMR resource is selected, the UE 101 further can configure in the CSI report how many layers are preferred by the RI, as well as which digital precoder is preferred by the PMI. All of these report quantities can cause the payload of the CSI report to large, especially if the UE 101 reports both sTRP and mTRP. For mTRP, the UE 101 has to report what is the UE preferred configuration for more than one TRP, both TRP 1 and TRP 2, for example. Thus, CSI compress can reduce the size of the CSI report by removing any redundant values that may overlap or are in common within the complete CSI report. For example, the UE 101 may prefer the same CRI for both sTRP and mTRP. For example, the UE 101 could indicate to the gNB 111 that it prefers the same resource from the first TRP, no matter whether sTRP or mTRP are being reported. Another example is the UE 101 could prefer the same PMI. Thus, the UE 101 would prefer a precoding matrix from the first TRP regardless of whether there is a sTRP transmission or mTRP transmission. As such, the UE 101 can be enabled to compress its CSI overhead. In this case, certain values/variables do not have to be reported twice, as part of the different report quantity values by the UE 101 being configured to perform CSI compression of the CSI report. CSI compress can thus enable one or more of the report quantities to be shared and compressed between the sTRP and mTRP in a single CSI report in order to lower overhead, for example.

Additionally, or alternatively, the UE 101 can report whether the CSI report utilizes CSI compression. For example, the UE 101 can indicate in the CSI report whether a report quantity is being shared among different TRPs, sTRP or mTRP operations, and thus, is not being reported twice. The UE preference of a report quantity may be largely determined based on the channel or a channel quality, for example, as to whether the UE 101 compresses or shares the CRI or the PMI. Thus, the UE 101 can configure a field or flag in the CSI report to indicate to the gNB 111 that the same PMI or CRI is being report for the sTRP and mTRP. The UE 101 then would only report one of the PMIs for one TRP and not report the PMI twice, or the UE could set another flag to report the same CRI so that the gNB 111 does not have to decode another CRI in the CSI report, for example.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example can be an user equipment (UE), comprising: a memory; and processing circuitry configured to: receive a Radio Resource Control (RRC) message with a CSI report configuration corresponding to a channel state information (CSI) report based on a single transmission and reception point (sTRP) operation and a multiple TRP (mTRP) operation; and generate the CSI report based on the CSI report configuration and a plurality of CSI report priority variables associated with measurements for the sTRP operation and measurements for the mTRP operation.

A second example can include the first example, wherein the processing circuitry is further configured to: generate the CSI report based on a CSI report priority variable associated with the measurements for the sTRP operation having a higher priority or a lower priority than for the measurements for the mTRP operation.

A third example can include the first or second example, wherein the processing circuitry is further configured to: divide CSI into a plurality of CSI parts associated with different priorities for the CSI report; and in response to the CSI report configuration configuring more CSI processing units (CPUs) than an associated UE capability for the CSI report, omit updating one or more CSI parts of the plurality of CSI parts based on the different priorities from the CSI report.

A fourth example can include any one or more of the first through third examples, wherein the processing circuitry is further configured to: divide CSI into a plurality of CSI parts associated with different priorities for the CSI report; determine whether the different priorities of the plurality of CSI parts impacts a CSI multiplexing and an uplink control information (UCI) omission; and in response to one or more of the different priorities of the plurality of CSI parts impacting the CSI multiplexing and the UCI omission and a total CSI exceeds a payload of a physical channel transmission for the CSI report, omit one or more CSI parts of the plurality of CSI parts based on the different priorities from the CSI report.

A fifth example can include any one or more of the first through fourth examples, wherein the processing circuitry is further configured to: in response to the different priorities of the plurality of CSI parts not impacting the CSI multiplexing and the UCI omission and the total CSI exceeds the payload of the physical channel transmission for the CSI report, determine whether to transmit the plurality of CSI parts in the CSI report or omit the plurality of CSI parts from the CSI report.

A sixth example can include any one or more of the first through fifth examples, wherein the processing circuitry is further configured to: generate the CSI report by dividing different CSI report measurements of a corresponding CSI into a plurality of CSI sub-reports with a same priority by: ordering the plurality of CSI sub-reports in a concatenation sequence for the CSI report, and ordering the different CSI report measurements of the corresponding CSI based on a first association with the sTRP operation and a second association with the mTRP operation within the plurality of CSI sub-reports in the concatenation sequence; or concatenating the different CSI report measurements of the corresponding CSI based on the first association with the sTRP operation and the second association with the mTRP operation, and concatenating the plurality of CSI sub-reports within the different CSI report measurements of the corresponding CSI that are ordered based on the first association or the second association.

A seventh example can include any one or more of the first through sixth examples, wherein the processing circuitry is further configured to: receive a media access control (MAC) control element (MAC-CE) to dynamically modify channel management resources (CMRs) of the CSI report configuration, wherein the MAC-CE comprises a CSI report configuration ID, a serving cell index and one or more selections of a number CSI resources for sTRP measurement and a number of pairs of CSI resources configured for mTRP measurement.

An eighth example can include any one or more of the first through seventh examples, wherein the MAC-CE comprises a bitmap that indicates which reference signals that are deactivated or activated for measurement in the CSI report, wherein the number of CSI resources for sTRP measurement comprises a maximum number of CSI resources for sTRP measurement from among a superset of resources of the CSI report configuration, and the number of pairs of CSI resources configured for mTRP measurement comprises a maximum number of pairs of CSI resources from among the superset of resources.

A ninth example can include any one or more of the first through eighth examples, wherein the MAC-CE comprises a first number of first resources in priority of a first set of resources to select for the sTRP measurement of a first TRP, a second number of first resources in priority of a second set of resources for the sTRP measurement of a second TRP, and a third number of first resources in priority of the number of pairs of CSI resources for the mTRP measurement.

A tenth example can include any one or more of the first through ninth examples, wherein the processing circuitry is further configured to: activate or deactivate corresponding CSI interference measurement (CSI-IM) resources based on a one-to-one mapping to the CMRs of the CSI report configuration that are modified via the MAC-CE.

An eleventh example can include any one or more of the first through tenth examples, wherein the processing circuitry is further configured to: receive a MAC-CE to dynamically modify CMRs of the CSI report configuration, wherein the MAC-CE comprises a CSI report configuration ID, a serving cell index and one or more indications to modify reporting of the CSI report with only sTRP testing, only mTRP testing or both sTRP testing and mTRP testing.

An twelfth example can include any one or more of the first through eleventh examples, wherein the processing circuitry is further configured to: generate the CSI report with a CSI compression so that one or more report quantities of the sTRP operation that shared or in common with the one or more report quantities of the mTRP operation are reported only once in the CSI report, wherein the one or more report quantities comprise one or more of: a CSI-RS resource indicator (CRI), a synchronization signal (SS)/physical broadcast resource block indicator (SSBRI), a rank indicator (RI), a precoding matrix indicator (PMI), or a layer indicator (LI).

A thirteenth example can include any one or more of the first through twelfth examples, wherein the processing circuitry is further configured to: provide an indicator of CSI compression corresponding to the one or more report quantities in the CSI report.

A fourteenth example can be a baseband processor comprising: a memory, and processing circuitry configured to: receive a Radio Resource Control (RRC) message with a CSI report configuration that enables a channel state information (CSI) report based on a single transmission and reception point (sTRP) operation and a multiple TRP (mTRP) operation; and transmit the CSI report with measurements of the sTRP operation and the mTRP operation based on the CSI report configuration.

A fifteenth example can include the fourteenth example, wherein the processing circuitry is further configured to: generate CSI report based on a plurality of weighted CSI report priority variables, wherein the plurality of weighted CSI report priority variables comprises measurements associated the sTRP operation and measurements associated with the mTRP operation, a report type, a report quantity, a serving cell index and a report configuration ID.

A sixteenth example can include any one or more of the fourteenth through the fifteenth examples, wherein the processing circuitry is further configured to: configure the measurements associated with the sTRP operation with a different priority than the measurements associated with the mTRP operation.

A seventeenth example can include any one or more of the fourteenth through the sixteenth examples, wherein the processing circuitry is further configured to: divide CSI into a plurality of CSI parts associated with priorities for the CSI report; determine whether one or more of the priorities impacts a CSI multiplexing and an uplink control information (UCI) omission; and in response to the one or more of the priorities impacting the CSI multiplexing and the UCI omission and a total CSI exceeding a payload amount of a physical uplink control channel (PUCCH) or a physical uplink shared channel (PUSCH) for the CSI report, omit one or more CSI parts of the plurality of CSI parts from the CSI report based on the priorities.

An eighteenth example can include any one or more of the fourteenth through the seventeenth examples, wherein the processing circuitry is further configured to: divide CSI into a plurality of CSI parts associated with priorities for the CSI report; and in response to the one or more of the priorities not impacting a CSI processing unit (CPU) overbooking handling and CSI processing units for the CSI report exceed a UE capability for a physical channel transmission of the CSI report, perform measurement all of the plurality of CSI parts, or none of the plurality of CSI parts for the CSI report.

A nineteenth example can include any one or more of the fourteenth through the eighteenth examples, wherein the processing circuitry is further configured to: generate the CSI report for measurements of both the sTRP operation and the mTRP operation by dividing different CSI measurement reports for corresponding CSI into a plurality of CSI parts with a same priority by: multiplexing mTRP measurements and sTRP measurements within the different CSI measurement reports for the corresponding CSI, and concatenating the different CSI measurement reports into the CSI report; or concatenating the plurality of CSI parts associated with the sTRP operation and concatenating the plurality of CSI parts associated with the mTRP operation, and ordering the plurality of CSI parts associated with the sTRP operation and the plurality of CSI parts associated with the mTRP operation based on the different CSI measurement reports for the corresponding CSI in the CSI report.

A twentieth example is a base station comprising: a memory, and processing circuitry configured to: transmit a Radio Resource Control (RRC) message with a CSI report configuration that enables a channel state information (CSI) report based on a single transmission and reception point (sTRP) operation and a multiple TRP (mTRP) operation; and receive the CSI report with measurements of the sTRP operation and the mTRP operation based on the CSI report configuration.

A twenty-first example can include the twentieth example, wherein the CSI report is based on a plurality of weighted CSI report priority variables, wherein the plurality of weighted CSI report priority variables comprises measurements associated the sTRP operation and measurements associated with the mTRP operation, a report type, a report quantity, a serving cell index and a report configuration ID, wherein the measurements associated with the sTRP operation are configured with a different priority than the measurements associated with the mTRP operation.

A twenty-second example can include any one or more of the twentieth example through twenty-first examples, wherein the processing circuitry is further configured to: transmit a media access control (MAC) control element (MAC-CE) to dynamically update channel management resources (CMRs) of the CSI report configuration, wherein the MAC-CE comprises a CSI report configuration ID, a serving cell index and one or more selections of a number CSI resources for sTRP measurement and a number of pairs of CSI resources configured for mTRP measurement.

A twenty-third example can include any one or more of the twentieth example through twenty-second examples, wherein the processing circuitry is further configured to: activate or deactivate corresponding CSI interference measurement (CSI-IM) resources of the CMRs based on a one-to-one mapping to the CMRs of the CSI report configuration that are activated or deactivated via the MAC-CE in a bitmap.

A twenty-fourth example can include any one of the twentieth through twenty-third examples, wherein the processing circuitry is further configured to: transmit a MAC-CE to dynamically modify CMRs of the CSI report configuration, wherein the MAC-CE comprises a CSI report configuration ID, a serving cell index and one or more indications to activate or deactivate reporting of sTRP testing, mTRP testing, or both sTRP testing and mTRP testing.

A twenty-fifth example can include an apparatus comprising means to perform one or more elements of a method described in or related to any of first thru twenty-first examples, or any other method or process described herein.

A twenty-sixth example can include one or more non-transitory computer-readable media comprising instructions to cause an electronic device, upon execution of the instructions by one or more processors of the electronic device, to perform one or more elements of a method described in or related to any one of the first thru twenty-first examples, or any other method or process described herein.

A twenty-seventh example can include an apparatus comprising logic, modules, or circuitry to perform one or more elements of a method described in or related to any one of the first thru twenty-first examples, or any other method or process described herein.

A twenty-eighth example can include a method, technique, or process as described in or related any one of the first thru twenty-first examples, or portions or parts thereof.

A twenty-ninth example can include an apparatus comprising: one or more processors and one or more computer-readable media comprising instructions that, when executed by the one or more processors, cause the one or more processors to perform the method, techniques, or process as described in or related to any one of the first thru twenty-first examples, or portions thereof.

A thirtieth example can include a signal as described in or related to any of examples 1-29, or portions or parts thereof.

A thirty-first example can include a datagram, packet, frame, segment, protocol data unit (PDU), or message as described in or related to any one of the first thru twenty-first examples, or portions or parts thereof, or otherwise described in the present disclosure.

A thirty-second example can include a signal encoded with data as described in or related to any one of the first thru twenty-first examples, or portions or parts thereof, or otherwise described in the present disclosure.

A thirty-third example can include a signal encoded with a datagram, packet, frame, segment, protocol data unit (PDU), or message as described in or related to any one of the first thru twenty-first examples, or portions or parts thereof, or otherwise described in the present disclosure.

A thirty-fourth example can include an electromagnetic signal carrying computer-readable instructions, wherein execution of the computer-readable instructions by one or more processors is to cause the one or more processors to perform the method, techniques, or process as described in or related to any one of the first thru twenty-first examples, or portions thereof.

A thirty-fifth example can include a computer program comprising instructions, wherein execution of the program by a processing element is to cause the processing element to carry out the method, techniques, or process as described in or related to any one of the first thru twenty-first examples, or portions thereof.

A thirty-sixth example can include a signal in a wireless network as shown and described herein.

A thirty-seventh example can include a method of communicating in a wireless network as shown and described herein.

A thirty-eighth example can include a system for providing wireless communication as shown and described herein.

A thirty-ninth example can include a device for providing wireless communication as shown and described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A user equipment (UE), comprising:
   radio frequency (RF) circuitry;
   a memory; and
   processing circuitry configured to, when executing instructions stored in the memory, cause the UE to:
   receive a Radio Resource Control (RRC) message with a channel state information (CSI) report configuration for a single transmission reception point (sTRP) operation and a multiple transmission reception point (mTRP) operation;
   determine that a plurality of CSI report priority variables associated with one or more measurements for the sTRP operation and one or more measurements for the mTRP operation have a same priority level;
   in response to the determination:
   concatenate the one or more measurements for the mTRP operation together in a first concatenation, and separately concatenate the one or more measurements for the sTRP operation together in a second concatenation;
   perform a further concatenation on the first concatenation and the second concatenation to form a CSI report; and
   transmit the CSI report via the RF circuitry.

2. The UE of claim 1, wherein the processing circuitry is further configured to cause the UE to:
   receive a medium access control (MAC) control element (MAC-CE) to dynamically modify channel measurement resources (CMRs) of the CSI report configuration, wherein the MAC-CE comprises a CSI report configuration ID, a serving cell index, and one or more selections of a number of CSI resources for sTRP measurement and a number of pairs of CSI resources for mTRP measurement.

3. The UE of claim 2, wherein the MAC-CE further comprises a bitmap that indicates which reference signals are deactivated or activated for measurement for the CSI report, wherein the number of CSI resources for sTRP measurement comprises a maximum number of CSI resources for sTRP measurement from a superset of resources of the CSI report configuration, and the number of pairs of CSI resources configured for mTRP measurement comprises a maximum number of pairs of CSI resources from the superset of resources.

4. The UE of claim 2, wherein the MAC-CE comprises a first number of first resources in priority of a first set of resources to select for the sTRP measurement of a first TRP, a second number of first resources in priority of a second set of resources for the sTRP measurement of a second TRP, and a third number of first resources in priority of the number of pairs of CSI resources for the mTRP measurement.

5. The UE of claim 2, wherein the processing circuitry is further configured to cause the UE to:
   activate or deactivate corresponding CSI interference measurement (CSI-IM) resources based on a one-to-one mapping to the CMRs of the CSI report configuration that are modified via the MAC-CE.

6. The UE of claim 1, wherein the processing circuitry is further configured to cause the UE to:
   receive a medium access control (MAC) control element (MAC-CE) to dynamically modify channel measurement resources (CMRs) of the CSI report configuration, wherein the MAC-CE comprises a CSI report configuration ID, a serving cell index, and one or more indications to modify reporting of the CSI report with only sTRP testing, only mTRP testing, or both sTRP testing and mTRP testing.

7. The UE of claim 1, wherein the processing circuitry is further configured to cause the UE to:
   generate the CSI report with a CSI compression such that one or more report quantities of the sTRP operation that are shared with one or more report quantities of the mTRP operation are reported only once in the CSI report, wherein the one or more report quantities comprise one or more of: a CSI-RS resource indicator (CRI), a synchronization signal (SS)/physical broadcast resource block indicator (SSBRI), a rank indicator (RI), a precoding matrix indicator (PMI), or a layer indicator (LI).

8. The UE of claim 7, wherein the processing circuitry is further configured to cause the UE to:
   provide an indicator of CSI compression corresponding to the one or more shared report quantities in the CSI report.

9. The UE of claim 1, wherein the further concatenation includes ordering the first concatenation first and the second concatenation second.

10. The UE of claim 9,
    wherein the one or more concatenated measurements for the mTRP operation in the first concatenation are implied to have priority over the one or more concatenated measurements for the sTRP operation in the second concatenation with respect to CSI multiplexing and uplink control information (UCI) omission.

11. A baseband processor configured to, when executing instructions stored in a memory, perform operations comprising:
    receiving a Radio Resource Control (RRC) message with a channel state information (CSI) report configuration for a single transmission reception point (sTRP) operation and a multiple transmission reception point (mTRP) operation;
    in response to a plurality of CSI report priority variables associated with one or more measurements for the sTRP operation and one or more measurements for the mTRP operation having a same priority level:
    concatenating the one or more measurements for the mTRP operation together in a first concatenation, and separately concatenating the one or more measurements for the sTRP operation together in a second concatenation;
    performing a further concatenation on the first concatenation and the second concatenation to form a CSI report; and
    providing the CSI report to a radio frequency (RF) interface for transmission.

12. The baseband processor of claim 11, wherein the plurality of CSI report priority variables comprise one or more of: measurements associated with the sTRP operation and measurements associated with the mTRP operation, a report type, a report quantity, a serving cell index, or a report configuration ID.

13. The baseband processor of claim 11,
wherein the further concatenation includes ordering the first concatenation first and the second concatenation second.

14. The baseband processor of claim 13,
wherein the one or more concatenated measurements for the mTRP operation in the first concatenation are implied to have priority over the one or more concatenated measurements for the sTRP operation in the second concatenation with respect to CSI multiplexing and uplink control information (UCI) omission.

15. A base station comprising:
radio frequency (RF) circuitry;
a memory; and
processing circuitry configured to, when executing instructions stored in the memory, cause the base station to:
  transmit, via the RF circuitry, a Radio Resource Control (RRC) message with a channel state information (CSI) report configuration for a CSI report based on a single transmission reception point (sTRP) operation and a multiple transmission reception point (mTRP) operation; and
  receive the CSI report based on the CSI report configuration, the CSI report including one or more measurements for the mTRP operation concatenated together in a first concatenation and one or more measurements for the sTRP operation concatenated together in a second concatenation separate from the first concatenation, wherein the first concatenation and the second concatenation are further concatenated to form the CSI report.

16. The base station of claim 15, wherein the CSI report is based on a plurality of weighted CSI report priority variables, wherein the plurality of weighted CSI report priority variables comprise one or more of: measurements associated with the sTRP operation and measurements associated with the mTRP operation, a report type, a report quantity, a serving cell index, or a report configuration ID.

17. The base station of claim 15, wherein the processing circuitry is further configured to cause the base station to:
transmit, via the RF circuitry, a medium access control (MAC) control element (MAC-CE) to dynamically update channel measurement resources (CMRs) of the CSI report configuration, wherein the MAC-CE comprises a CSI report configuration ID, a serving cell index, and one or more selections of a number of CSI resources for sTRP measurement and a number of pairs of CSI resources for mTRP measurement.

18. The base station of claim 17, wherein the processing circuitry is further configured to cause the base station to:
activate or deactivate corresponding CSI interference measurement (CSI-IM) resources based on a one-to-one mapping to the CMRs of the CSI report configuration that are updated via the MAC-CE.

19. The base station of claim 15, wherein the processing circuitry is further configured to cause the base station to:
transmit, via the RF circuitry, a medium access control (MAC) control element (MAC-CE) to dynamically modify channel measurement resources (CMRs) of the CSI report configuration, wherein the MAC-CE comprises a CSI report configuration ID, a serving cell index, and one or more indications to activate or deactivate reporting of sTRP testing, mTRP testing, or both sTRP testing and mTRP testing.

* * * * *